US010832252B2

(12) United States Patent
Tsai et al.

(10) Patent No.: US 10,832,252 B2
(45) Date of Patent: *Nov. 10, 2020

(54) SYSTEM AND METHODS TO PREVENT UNAUTHORIZED USAGE OF CARD READERS

(71) Applicant: BBPOS LMITED, Tsuen Wan (HK)

(72) Inventors: Hwai Sian Tsai, Hong Kong (HK); Chi Wah Lo, Hong Kong (HK)

(73) Assignee: BBPOS LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,213

(22) Filed: Apr. 25, 2019

(65) Prior Publication Data

US 2019/0251568 A1  Aug. 15, 2019

Related U.S. Application Data

(63) Continuation of application No. 16/046,573, filed on Jul. 26, 2018, now Pat. No. 10,318,959, which is a
(Continued)

(51) Int. Cl.
*G06Q 20/40* (2012.01)
*G06Q 20/34* (2012.01)
(Continued)

(52) U.S. Cl.
CPC ............. *G06Q 20/409* (2013.01); *G06K 7/06* (2013.01); *G06K 7/10009* (2013.01);
(Continued)

(58) Field of Classification Search
CPC .. G06Q 20/34; G06Q 20/409; G06Q 20/3224; G06K 7/06; G06K 7/10009; G06K 7/10405
See application file for complete search history.

(56) References Cited

U.S. PATENT DOCUMENTS

2006/0214845 A1  9/2006  Jendbro et al.
2013/0144731 A1  6/2013  Baldwin et al.
(Continued)

FOREIGN PATENT DOCUMENTS

CN  101039183 A  9/2007
CN  101329399 A  12/2008
(Continued)

OTHER PUBLICATIONS

National Intellectual Property Administration, PRC; The First Office Action of CN Application No. 201780082209.9; (related application); dated Feb. 21, 2020; 16 pages.
(Continued)

*Primary Examiner* — Laura A Gudorf
(74) *Attorney, Agent, or Firm* — Gregory M. Howison

(57) ABSTRACT

A contactless card reader comprises a contactless card reader front-end coupled to a processor. A communications module is coupled to the processor and a set of sensors is coupled to the processor. The set of sensors determines parameters related to the location, orientation and motion of the card reader. The processor receives the parameters from the set of sensors and utilizes the parameters and scenario configuration data to evaluate a rule. The result of the evaluation of the rule results in a limitation on the operation of the card reader. The communications module is configured to intermittently receive the scenario configuration data from external sources.

20 Claims, 6 Drawing Sheets

Related U.S. Application Data continuation of application No. 15/343,917, filed on Nov. 4, 2016, now Pat. No. 10,055,738.

(51) Int. Cl.
  *G07F 7/08* (2006.01)
  *G06K 7/10* (2006.01)
  *G06K 7/06* (2006.01)

(52) U.S. Cl.
  CPC ......... *G06K 7/10405* (2013.01); *G06Q 20/34* (2013.01); *G06Q 20/352* (2013.01); *G07F 7/0893* (2013.01)

(56) References Cited

U.S. PATENT DOCUMENTS

| | | |
|---|---|---|
| 2014/0085089 A1 | 3/2014 | Rasband et al. |
| 2015/0310410 A1 | 10/2015 | Chai et al. |
| 2018/0096329 A1 | 4/2018 | Hamilton et al. |

FOREIGN PATENT DOCUMENTS

| | | |
|---|---|---|
| CN | 101836223 A | 9/2010 |
| CN | 202662098 U | 1/2013 |
| CN | 102956069 A | 3/2013 |
| CN | 103413218 A | 11/2013 |
| CN | 103377517 | 5/2016 |

OTHER PUBLICATIONS

Translation of Intellectual Property Administration, PRC; The First Office Action of CN Application No. 201780082209.9; (related application); OA dated Feb. 21, 2020; 13 pages.

|  | Mobility<br>Location of Card Reader | |
|---|---|---|
|  | Static | Motion |
| Fixed | Terminal fixed in store with restricted access | Ticketing machine on public vehicle |
| Mobile | Street merchant, taxi | Merchant on vehicle (vending trolley on train) |
| Handheld | Package delivery | Merchant on vehicle (in-flight purchase) |

Portability
Motion of Card Reader at Location

FIG. 3

| | Reader Motion | Installation Motion | Location | Orientation | Motion |
|---|---|---|---|---|---|
| 401 | Fixed | Static | Fixed location<br>GPS: Exact<br>Beacon: Received<br>Altimeter: Exact | Fixed orientation<br>Orientation/incline sensor: Exact<br>Compass: Exact | No movement (displacement, velocity, acceleration)<br>Accelerometer: Static<br>Gyroscope: Static |
| 402 | Fixed | Motion | Supplement to orientation information for decision making<br>GPS: In range<br>Beacon: Received<br>Altimeter: In range | Orientation within limited range with limited rate of change compared to rate of change of motion and location<br>Orientation/incline sensor: In range<br>Compass: Agree with gyroscope. | No movement for a period of time, movement will trigger re-authorization<br>Accelerometer: Agree with GPS prediction and orientation range<br>Gyroscope: Agree with compass |
| 403 | Mobile | Static | Within a pre-defined range, fixed for a period of time before reading, re-authorization after relocation<br>GPS: In range and static<br>Beacon: Received<br>Altimeter: In range and static | Within a pre-defined range, fixed for a period of time before reading, re-authorization after orientation change<br>Orientation/incline sensor: In range<br>Compass: Static | No movement for a period of time, movement triggers re-authorization<br>Accelerometer: Static<br>Gyroscope: Static |
| 404 | Mobile | Motion | Supplement to orientation information for decision making<br>GPS: In range<br>Beacon: Received<br>Altimeter: In range | Orientation within a limited range with rate of change not greatly exceeding the rate of change of motion and location<br>Orientation/incline sensor: In range<br>Compass: Agree with gyroscope | Supplement to orientation information for decision making<br>Accelerometer: Agree with GPS prediction & orientation range<br>Gyroscope: Agree with compass |

FIG. 4A

| Reader Motion | Installation Motion | Location | Orientation | Motion |
|---|---|---|---|---|
| Handheld | Static | Re-authorize after a location change that exceeds a pre-defined range<br>GPS: Exact<br>Beacon: Received<br>Altimeter: Exact | N/A | Allow for a limited range of acceleration and velocity. Re-authorization after a large displacement<br>Accelerometer: In range<br>Gyroscope: N/A |
| Handheld | Motion | Tied to vehicle or platform by season signal or pre-defined route<br>GPS: In range<br>Beacon: Received<br>Altimeter: In range | N/A | N/A |

405 (first data row), 406 (second data row)

FIG. 4B

| Reader Motion | Installation Motion | Location | Orientation | Motion |
|---|---|---|---|---|
| Fixed | Static | Fixed location<br>Beacon: Received | Fixed orientation<br>Orientation/incline sensor: Exact | No movement (displacement, velocity, acceleration)<br>Accelerometer: Static |
| Fixed | Motion | In a defined vehicle or compartment<br>Beacon: Received | Fixed installation in vehicle so incline reading is within range.<br>Orientation/incline sensor: In range | No large vertical displacement.<br>Accelerometer: Vertical displacement in range |
| Mobile | Static | Within a pre-defined range, fixed for a period of time before reading, re-authorization after relocation<br>Beacon: Received | Within a pre-defined range, fixed for a period of time before reading, re-authorization after orientation change<br>Orientation/incline sensor: In range | No movement for a period of time, movement triggers re-authorization<br>Accelerometer: Static |
| Mobile | Motion | Supplement to orientation information for decision making<br>Beacon: Received | Orientation within a limited range with rate of change not greatly exceeding the rate of change of motion and location<br>Orientation/incline sensor: In range | Supplement to orientation information for decision making<br>Accelerometer: Agree with predicted range |
| Handheld | Static | Within pre-defined range, re-authorization after large location change<br>Beacon: Received | N/A | Limited range of acceleration and velocity, re-authorization after large displacement<br>Accelerometer: In range |
| Handheld | Motion | Bind to vehicle by beacon signal or pre-defined route<br>Beacon: Received | N/A | N/A |

FIG. 5

SYSTEM AND METHODS TO PREVENT UNAUTHORIZED USAGE OF CARD READERS

CROSS-REFERENCE TO RELATED APPLICATIONS

This application is a Continuation of U.S. patent application Ser. No. 16/046,573, filed on Jul. 26, 2018, entitled SYSTEM AND METHODS TO PREVENT UNAUTHORIZED USAGE OF CARD READERS, which published on Nov. 22, 2018 as U.S. Patent Application Publication No. 2018-0336560. U.S. patent application Ser. No. 16/046,573 is a Continuation of U.S. patent application Ser. No. 15/343,917, filed on Nov. 4, 2016, entitled SYSTEM AND METHODS TO PREVENT UNAUTHORIZED USAGE OF CARD READERS, which published on May 10, 2018, as U.S. Publication No. 2018-0130059, and issued on Aug. 21, 2018, as U.S. Pat. No. 10,055,738. U.S. patent application Ser. Nos. 16/046,573 and 15/343,917, U.S. Patent Application Publication Nos. 2018-0336560 and 2018-0130059, and U.S. Pat. No. 10,055,738 are incorporated by reference in their entirety.

TECHNICAL FIELD

The present disclosure relates to the secure use of contactless card readers. In particular, it relates to the use of determining when a card reader is used in a fraudulent manner.

BACKGROUND

There exists a number of short-range wireless technologies to communicate between electronic devices such as smart tags and payment cards. Example of this type of wireless technology include touchless protocols such as RFID and NFC (Near Field Communication). There are a number of common applications known in the art such as bank cards, stored value cards, loyalty cards, and access cards. These cards often contain valuable and sensitive data which needs to be protected from unauthorized access. It is important to protect the privacy of the data and to ensure its authenticity and integrity.

Though there are obvious advantages of using a touchless card to make payments there are drawbacks as well. Inherent in the wireless nature of the technology is that it is much easier to access the card or to eavesdrop on data being transferred between a card and a card reader when compared to other technology that requires a direct connection between the card and the reader. Due to the fact that a card reader can read the card data without touching the card, unauthorized accessing or eavesdropping of card data transfers may occur without the user being aware of the unauthorized card reading operation.

A number of solutions to this problem that have been proposed. Some are based on improving security in the card while others concentrate on improving security in the card reader. A card reader can require the manual input of an authorization code or password at power up or at a predefined interval. Other systems detect when a card has been removed from the proximity of a reader and automatically stop any data transfer operations. Other security measures require the card holder to authenticate using an emulated card or e-wallet application on a mobile device that asks for a user password or biometric authentication before allowing access. These existing solutions are all cumbersome and detract from the simplicity of using touchless card technology. Furthermore, most existing solutions focus on increasing the reader side security. There exists a need for technology that supplements and complements security features in the card, emulated card, or wallet by increasing security in the card reader. Solutions should decrease the risk of data theft while preserving the ease-of-use of the NFC and other touchless card and wireless technology.

SUMMARY

In one exemplary embodiment of the invention a card reader comprises a contactless card reader front-end coupled to a processor. A communications module is coupled to the processor and a set of sensors is coupled to the processor. The set of sensors determines parameters related to the location, orientation and motion of the card reader. The processor receives the parameters from the set of sensors and utilizes the parameters and scenario configuration data to evaluate a rule. The result of the evaluation of the rule results in a limitation on the operation of the card reader.

In some embodiments of the invention the communications module is configured to intermittently receive the scenario configuration data from external sources. The communications module may be configured to tether an external device to the card reader. The external device comprises a second set of sensors. The second set of sensors determines parameters related to the location, orientation and motion of the card reader. The processor receives the second set of parameters through the communications module.

The card reader may be installed in a location and the rule may comprise parameters related to the location and movement of the location. The card reader may be fixed to a location. The card reader may be mobile within a location. The card reader may be a handheld device.

Another exemplary embodiment of the comprises a method of operating a card reader in a location. The method comprises installing the card reader in the location. The installation comprises classifying a mobility of the location and classifying a portability of the card reader. The card reader is configured with a scenario associated with the mobility of the location and the portability of the card reader. Parameters are read from a set of sensors located within the card reader. The parameters are related to the location, orientation and motion of the card reader. The parameters are evaluated to evaluate a rule. The rule is based on the scenario. The result of the evaluation of the rule results in a limitation on the operation of the card reader.

In some embodiments of the invention the configuration of the card reader comprises accessing the card reader through a communications module integrated with the card reader.

In other embodiments of the invention the method further comprises tethering an external device to the card reader. The external device comprises a second set of sensors. The second set of sensors determines parameters related to the location, orientation and motion of the card reader. The card reader receives the second set of parameters through the communications module. The card reader is installed in a location and the rule comprises parameters related to the location and movement of the location.

The method may apply when the card reader is fixed to a location. The method may apply when the card reader is mobile within a location. The method may apply when the card reader is a handheld device.

The foregoing and additional aspects and embodiments of the present disclosure will be apparent to those of ordinary skill in the art in view of the detailed description of various embodiments and/or aspects, which is made with reference to the drawings, herein.

BRIEF DESCRIPTION OF THE DRAWINGS

For a more complete understanding, reference is now made to the following description taken in conjunction with the accompanying Drawings in which:

FIG. 3 is a table illustrating examples for various locations and mobility options of a card reader;

FIG. 4A and FIG. 4B illustrate rules for given combinations of reader motion and installation motion for a large set of sensors; and FIG. 5 illustrates rules for given combinations of reader motion and installation motion for a limited set of sensors.

Figure 1:
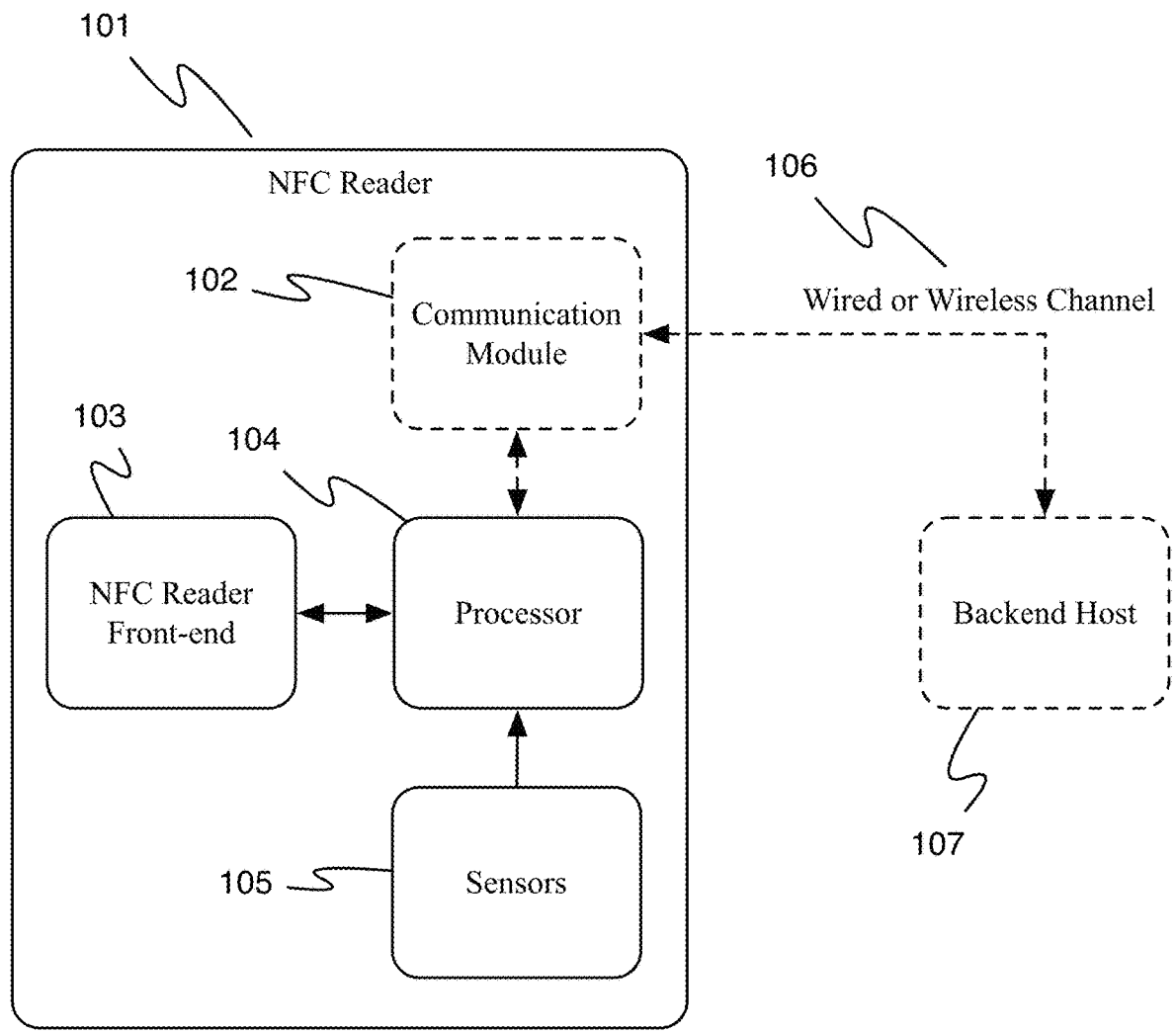
FIG. 1 is a diagram of a card reader with a non-persistent connection to a backend host.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

An example contactless card reader, using hardware and software compatible with the NFC or RFIC standards, is shown in FIG. 1. The card reader 101 comprises a number of electronic components such as a processor 104, an NFC reader front-end 103, a communication module 102, and a number of sensors 105. The processor 104 includes a CPU, volatile memory, and non-volatile memory as is known in the art. Non-volatile memory stores software or firmware to operate the device and may also store parameters, settings, and data tables to be preserved across power cycles. Examples of non-volatile memory include semiconductor ROM chips, flash memory cards, solid-state disks, and hard disks. Volatile memory is used to store program code for execution and variables used during program execution. The most common example of volatile memory is semiconductor RAM.

The NFC reader front-end 103 contains the analog and digital wireless circuitry to implement the NFC wireless protocol and to connect and communicate with the processor. The NFC reader front-end 103 can also be any other type of wireless, short-range wireless standard including RFID and Bluetooth. In some applications, the NFC reader front-end 103 can be configured by the processor 104.

The communications module 102 interfaces with a backend host 107 using any number of wired or wireless protocols. Wired protocols include Ethernet, USB, and serial ports. Wireless protocols include 802.11 and cellular phone technologies such as 3G or LTE. The backend host 107 can be used to monitor and configure the reader 101 and can be a computer, laptop, or other suitable device. The card reader 101 as per an exemplary embodiment of the invention includes a number of sensors 105 that may include a GPS, beacon receivers, altimeters, orientation or incline sensors, a compass, accelerometer and gyroscopes. A beacon signal is any signal that the card reader can identify and help the card reader to know it is near a particular spot. Examples of beacons are a dedicated transmitter that transmits a special data packet, a Wi-Fi router with a particular MAC address, and a cellular base station. Though the beacon is typically placed in a location, the card reader requires a receiver to detect the signal emitted by the beacon. Accelerometers may read 2 or 3 axis of motion and can therefore also function to indicate the orientation and incline of the card reader.

Sensors 105 can be used to detect the location and orientation of the card reader 101 as well as the speed, direction, and acceleration of movement of the card reader 101. The processor 104 interfaces with sensors 105 in order to monitor and collect readings. Sensor readings are analyzed to evaluate the likelihood of unintended, out of bounds, or fraudulent usage of the card reader.

Finally, the reader 101 will include any necessary antennas and front-end system 103 for reading cards by a variety of means including swiping, tapping, or inserting the card in a slot.

Again referring to FIG. 1, the communication module 102, backend host 107, and wired or wireless channel 106 is shown in a dashed line. This is to reflect the fact that these elements of the card reader 101 and card reader system may be on-line or off-line.

Configuration and transaction records may be loaded or unloaded in real time or in batches. Either the card reader 101 or the backend host 107 can determine when the communications elements go on-line or off-line. In on-line systems, analysis and decision making may be done by the backend host 107 or the card reader 101. In off-line systems, the card reader 101 will perform any required analysis, rule evaluation, and decision making.

Figure 2:
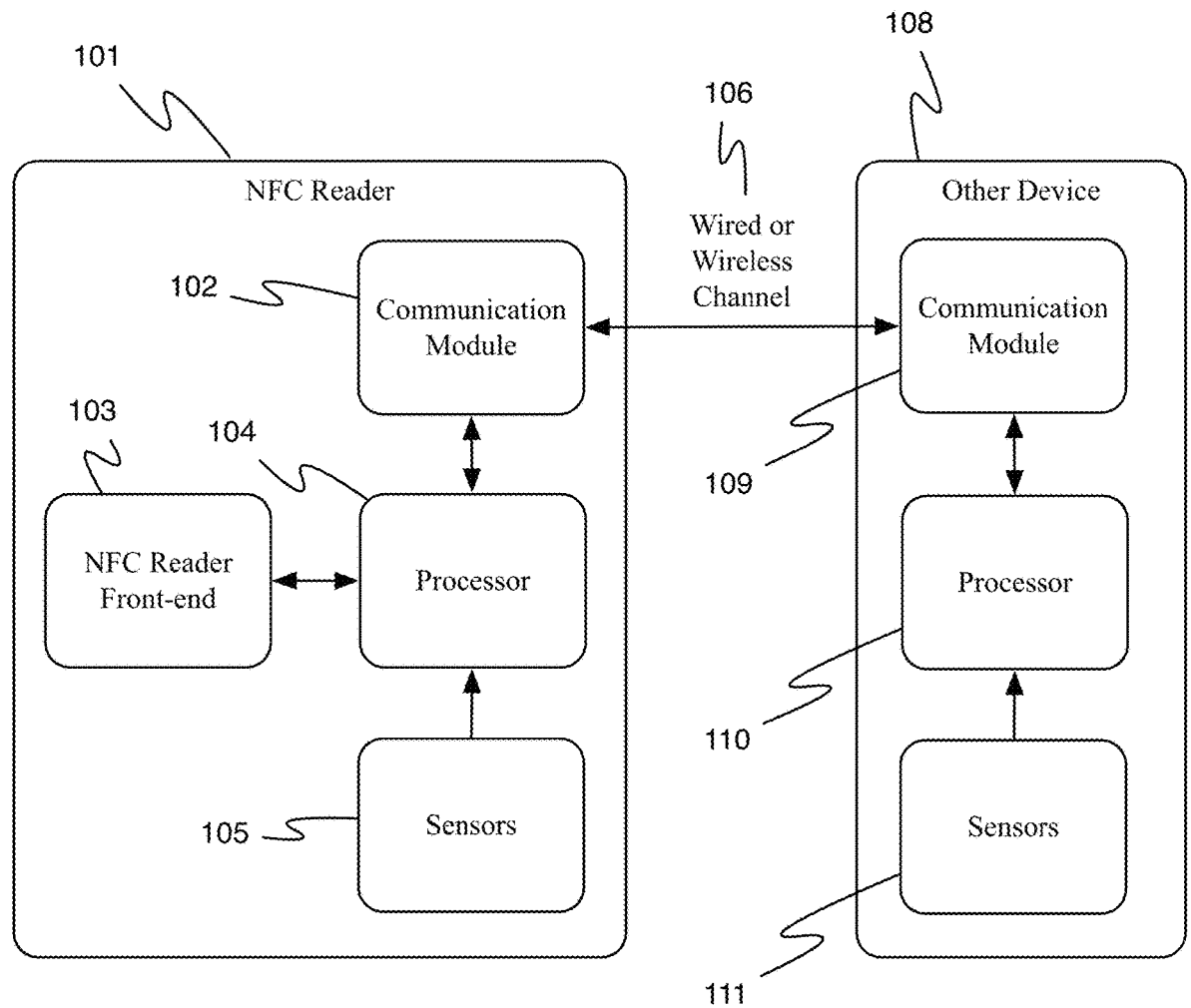
FIG. 2 is a diagram of a card reader tethered to another device.

FIG. 2 shows another embodiment of the invention where the card reader 101 can be connected to another device 108 to make use of capabilities of the other device 108. The other device 108 may be a handheld, mobile device such as a mobile handset. In this configuration the card reader 101 can make use of sensors 111 in the other device 108. The card reader 101 may also make use of the processing power 110 of the other device. If the other device 108 is not secure, the reader 101 will only make use of the other device's sensors 111 in ways that do not compromise analyses used to make security related decisions. For example, a GPS location sensor and an altimeter can be used if wired connection or short-range wireless connection is made, because the two devices' locations are expected to be quite close, however, an accelerometer and gyroscope are unlikely to be used unless it is some way to make sure there is no relative movement between the two devices. Either the backend host 107 of FIG. 1 or the other device 108 of FIG. 2 can be used to augment or replace the processing power of the card reader 101 for analysis of data and results, or decision making.

In use, the card reader 101 is first installed in its location and then authenticated with itself or over a network. Installation can be done through a user interface on the card reader 101, through an attached device 108, or through the backend host 107 accessed over the network 106. During the installation the card reader 101 is configured with information concerning its location, orientation, expected motion characteristics, and other parameters. Location information may include known GPS coordinates, altitude, and data concerning a nearby beacon. Orientation may include the direction the card reader 101 is facing and the inclination of the card reader. Motion may include whether the card reader 101 is expected to move, or if it does move, how fast and far it is expected to move. Similar configuration may also be done with respect to the location of the card reader 101. For example, a fixed store is not expected to move, a train may move at a moderate pace, while an aircraft will accelerate quickly and move much more quickly. A range of acceptable values may also be programmed for sensor readings. For example, an installation in a train may not be expected to have a velocity over 150 km/h. A card reader 101 in a store may not be expected to be further than 20 m from a beacon. A card reader fixed in place may not be expected to have a difference in inclination more than plus or minus 5 degrees.

Authentication may include verifying the identity of the user, merchant, or location. Authentication may also include logging into a network, attaching a dongle, USB device, or external device, and authenticating with a payment processor. Authentication and re-configuration may be repeated under a variety of conditions, examples of which are given below.

A number of scenarios of the real world usage according to embodiments of the invention are shown in FIG. 3. A card reader 101 is classified by "mobility", that is whether the location it is used in is in motion or is static relative to the earth. For a card reader "static" means the reader location is not in motion relative to earth during card reading, whereas "motion" means the reader location is expected to be in motion relative to earth during card reading. Examples of a card reader location that is static is in a fixed location such as a store. Non-exhaustive examples of a card reader locations that are in motion are if the reader is being used inside a bus, a train, a plane, a cart, or a ship.

Card readers 101 are also be classified by "portability", that is how they move, are repositioned, held, and are used within their place of use. The term "fixed" means the reader is fixed after installation and authentication and does not move within its location. An example would be if it is bolted to a mount, fixed in a holder, or secured to a counter. "mobile" means the reader location can change after installation and authentication. An example of this is a card reader that is being used in mobile arrangement such being placed on desk or in a cradle which relocates frequently. "Handheld" means the reader is expected to be handheld during card reading, either held by merchant or by the card owner.

A key aspect of the embodiments of the invention is for the card reader 101 to decide whether it is being use as intended. If it is detected that the card reader is not being used as intended this may be considered a security breach and measures can be taken to disable the card reader, limit its use, or require reverification. A number of intended usage scenarios are defined and sets of decision rules are applied to determine if the card reader is being used in the intended environment and in a way that is consistent with the expected behavior of the users. Rules are evaluated using input read from a number of sensors that may be located in the card reader, another device tethered or connected to the card reader, in the location, or in the card itself. In some cases, a single rule may suffice. In others, there may be multiple rules that may vary depending on the type of card, the interface between the card and the card reader 101 and the amount of the transaction, currency of the transaction, the bank or organization that issued the card and a number of other parameters. There may be separate rules for a government issued card, a card issued by a financial institution, a loyalty card, and a card issued by a private business.

FIGS. 4A and 4B gives example of an implementation according to one embodiment of the invention that utilizes a number of sensors; a GPS, beacon, altimeter, orientation/inclination sensor, compass accelerometer, and a gyroscope. Scenarios are defined based on whether the card reader is installed in a location in motion or static and if the reader itself is fixed in place, mobile, or handheld. FIGS. 4A and 4B list the expected data the card reader 101 would read from sensors 105 in the card reader, attached device 111, or other sensors. For each scenario rules are defined based on the location, orientation, and other parameters as sensed by the card reader 101. Location refers to the location of the card reader and can be measured by a GPS, beacons, altimeters, and other sensors. Orientation refers to the directional heading (north, south, east, west) and inclination, whether the reader is level. Orientation can be measured using sensors such as a compass, orientation/incline sensor, and others. Motion refers to the displacement, velocity and acceleration of the card reader over time. Motion can be measured using sensors such as an accelerometer, a gyroscope, and others. Note that for other scenarios and for other sensors, the rules may be modified or additional rules may be added or deleted.

A variance in any of the expected readings triggers an event that may force the card reader to re-authenticate, to shutdown, or to send an alert to a user, administrator, or other party monitoring the system. Variances may be indicated on the card reader, an attached device, or through a monitoring device or party over the network.

One scenario 401 is when the card reader is fixed in a static location. In this case the GPS and altimeter would be expected to correspond to the known location and the signal from a beacon installed in the same location would be received. The orientation and incline would be very close to the readings in which the card reader was installed. The accelerometer and gyroscope would indicate no movement.

Another scenario 402 is when the card reader is fixed in a location that is in motion. An example of this may be a card reader fixed at a check-out counter in a store on a train. The GPS and altimeter reading should be within the expected range and a beacon placed within the location will be readable. The orientation sensor/incline sensor will return a range of values that are consistent and cross-referenced with the present location of the installation as measured by the location readings and the motion readings. The compass readings will be consistent with the gyroscope readings. As the installation is expected to move, motion readings outside an expected range will be deemed to be unusual and may trigger a re-authorization procedure. Accelerometer readings should agree with the GPS data and orientation data. The gyroscope should return data consistent with the compass readings.

A further scenario 403 is where the card reader is mobile and the installation is static. This may occur when there is a mobile cart within a large building. The cart moves within the location but is not expected to exit the building. The location sensors, the GPS and altimeter will be within the range consistent with the bounds of the location. The location information will remain stable for a predefined time before a card is read since the cart will have to stop moving in order to process a transaction. Beacon information will be readable. Similarly, the orientation information will be within bounds and be stable for a short time before the card is read. Accelerometer and gyroscope information will be static within tight bounds. If no movement occurs for a predefined period of time (the cart has not moved in a long time), re-authorization may be required.

The next scenario 404 is a mobile reader installed on a platform in motion. This could be the case of a card reader fixed to a food and drink cart used on an aircraft. The GPS and altimeter sensor data will be consistent with an aircraft flight or more specifically, with the flight plan of a particular aircraft. GPS information will indicate that the cart and reader are still on the aircraft. Location will be used to supplement the orientation information. The orientation/incline sensor will be within a limited range qualified by the rate of change of the motion and location information. The compass data will agree with the gyroscope data. Motion data is used to supplement the orientation information for decision making. The accelerometer readings will agree with the GPS data and orientation data. The gyroscope will agree with the compass.

Next the scenario 405 of a handheld card reader in a static location is considered. This would correspond with a handheld payment card reader in a restaurant. The GPS and altimeter would be a match for the bounds of the location. A signal from a beacon would be received. A location change that exceeded the location bounds would trigger a re-authorization as it could indicate that the card reader had left the building. Due to the large number of movements experienced by a handheld device orientation information would not be used. Acceptable ranged of acceleration and velocity would be permitted as expected for a handheld device where the holder would be expected to be walking.

The final scenario 406 depicted in FIG. 4B is the case of a handheld card reader when the installed location is in motion. The location will be verified against the route of the location, such as in a delivery truck, where the route may also change based on season or weather. The GPS and altimeter data will be consistent with the route and a signal from a beacon in the truck will be received. Often orientation and motion information will not be used in this scenario.

FIG. 5 shows an alternative preferred embodiment of a card reader 101 with fewer sensors 105, 111 compared to the previous embodiment of FIGS. 4A and 4B. The embodiment of FIG. 5 cover the same scenarios as in FIGS. 4A and 4B but the sensors 105, 111 are limited to a beacon, orientation/inclination sensor, and an accelerometer. Sensors and readings are still divided into three groups; location, orientation, and motion. A beacon is installed at the location and is used to verify that the card reader is within range of the location. If the card reader moves too far from the beacon it will lose contact with the card reader 101. The orientation of the card reader is detected using only an orientation/incline sensor. An accelerometer is used to determine motion.

Processing may be done by the card reader 101, other tethered device 108, the backend host 107, or any combination of the above.

The above listed preferred implementation by no means to be exhaustive, and many possible ways of implementation using different combinations of sensors are possible.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A card reader comprising:
   a card reader front-end coupled to a processor; and
   the processor receives a set of parameters related to a location, orientation and motion of the card reader from a set of sensors coupled to the processor, and utilizes the set of parameters and first scenario configuration data to evaluate a first rule,
   wherein the evaluation of the first rule results in a limitation on an operation of the card reader,
   said first scenario configuration data is based on a classification of a first mobility of the card reader, and
   the classification of the first mobility of the card reader comprises selection of a usage location of the card reader either being static or in motion.

2. The card reader of claim 1, wherein an external device is coupled to the card reader.

3. The card reader of claim 2, wherein the set of sensors is located within the external device.

4. The card reader of claim 2, wherein the evaluation of the first rule is performed on the external device.

5. The card reader of claim 1, wherein the processor utilizes the set of parameters and second scenario configuration data to evaluate a second rule.

6. The card reader of claim 1, further comprising a communications module coupled to the processor.

7. The card reader of claim 6, wherein the communications module receives the first scenario configuration data from external sources.

8. The card reader of claim 6, wherein the evaluation of the first rule is performed by a backend host coupled to the communications module.

9. The card reader of claim 1, wherein the processor utilizes the set of parameters and second scenario configuration data to evaluate a second rule and
wherein said second scenario configuration data is based on a classification of a second mobility of the card reader.

10. The card reader of claim 1, wherein the first rule is based on either an amount of a transaction or a currency of the transaction.

11. A method for reading a card in a usage location, the method comprising:
providing a card reader comprising a card reader front-end and a communications module,
wherein the card reader front-end and the communications module are coupled to a processor; and
configuring the processor to:
receive a set of parameters related to a location, orientation and motion of the card reader from a set of sensors coupled to the processor,
utilize the set of parameters and scenario configuration data to evaluate one or more rules,
wherein the evaluation of the one or more rules results in a limitation on an operation of the card reader, and
said scenario configuration data is based on a classification of a mobility of the card reader, wherein the classification of the mobility of the card reader comprises selection of the usage location of the card reader either being static or in motion.

12. The method of claim 11, further wherein said scenario configuration data is based on a classification of a portability of the card reader.

13. The method of claim 12, further wherein the classification of the portability of the card reader comprises selecting one of fixed, mobile or handheld.

14. The method of claim 11, wherein at least one of the one or more rules is based on at least one of a range of accelerations and a range of velocities.

15. The method of claim 11, wherein at least one of the one or more rules is based on matching a plan or a route.

16. The method of claim 11, wherein the set of parameters comprise at least one of Global Positioning Satellite (GPS) and altimeter readings.

17. The method of claim 11, wherein the set of parameters comprise at least one of accelerometer and gyroscope readings.

18. The method of claim 11, wherein at least one of the one or more rules is based on at least one of a displacement and an orientation of the card reader.

19. The method of claim 11, wherein at least one of the one or more rules is based on either an amount of a transaction or a currency of the transaction.

20. The method of claim 11, wherein the card is issued by a bank or an organization, and at least one of the one or more rules is based on the bank or the organization.

* * * * *